(12) United States Patent
Luo

(10) Patent No.: US 10,630,230 B2
(45) Date of Patent: Apr. 21, 2020

(54) SOLAR GENERATOR APPARATUS WITH ELASTICALLY RESTRICTIVE AND CABLE-CONTROLLED TRACKING

(71) Applicants: BIG SUN ENERGY TECHNOLOGY INC., Hsinchu County (TW); Chia Ching Luo, Hsinchu County (TW)

(72) Inventor: Chia Ching Luo, Hsinchu County (TW)

(73) Assignees: BIG SUN ENERGY TECHNOLOGY INC., Hukou Township, Hsinchu County (TW); Chia Ching LUO, Hukou Township, Hsinchu County (TW)

( * ) Notice: Subject to any disclaimer, the term of this patent is extended or adjusted under 35 U.S.C. 154(b) by 206 days.

(21) Appl. No.: 15/867,411

(22) Filed: Jan. 10, 2018

(65) Prior Publication Data

US 2018/0254739 A1    Sep. 6, 2018

(30) Foreign Application Priority Data

Mar. 3, 2017 (TW) .............................. 106106936 A

(51) Int. Cl.
*H02S 20/32* (2014.01)
*H02S 20/30* (2014.01)
(Continued)

(52) U.S. Cl.
CPC .............. *H02S 20/32* (2014.12); *F24S 25/12* (2018.05); *F24S 30/48* (2018.05); *H02S 20/20* (2014.12);
(Continued)

(58) Field of Classification Search
None
See application file for complete search history.

(56) References Cited

U.S. PATENT DOCUMENTS

| 1,281,128 A | 10/1918 | Borer |
| 1,709,198 A * | 4/1929 | Speidel .................... F16F 1/04 |
| | | 267/73 |

(Continued)

FOREIGN PATENT DOCUMENTS

| CN | 103195782 A | 7/2013 |
| CN | 205315577 U | 6/2016 |

(Continued)

OTHER PUBLICATIONS

Japanese Patent Office, Office Action, dated Dec. 28, 2018, 4 pages.

*Primary Examiner* — Magali P Slawski

(74) *Attorney, Agent, or Firm* — Muncy, Geissler, Olds & Lowe, PC

(57) ABSTRACT

A solar generator apparatus includes: a generator module having first to fourth corner portions; a middle column mounted on a fixed structure and pivotally connected to the generator module; first and second winding devices attached to the middle column; first to fourth cables; and first to fourth elastic anchors. The first to fourth cables have first ends respectively connected to the first to fourth corner portions. The first and third cables are wound around the first winding device. The second and fourth cables are wound around the second winding device. The first to fourth elastic anchors are elastically mounted on the fixed structure. The first to fourth cables respectively pass through the first to fourth elastic anchors to form two W-shaped structures. Each elastic anchor includes an elastic member and a restricting member connected in parallel. The restricting member restricts a maximum deformation amount of the elastic member.

6 Claims, 10 Drawing Sheets

(51) Int. Cl.
*F16G 13/12* (2006.01)
*F24S 30/48* (2018.01)
*F24S 25/12* (2018.01)
*H02S 20/20* (2014.01)
*H02S 30/00* (2014.01)
*F24S 40/80* (2018.01)
*F24S 25/00* (2018.01)
*F24S 30/45* (2018.01)
*F24S 30/00* (2018.01)

(52) U.S. Cl.
CPC ............... *H02S 30/00* (2013.01); *F24S 30/45* (2018.05); *F24S 40/85* (2018.05); *F24S 2025/017* (2018.05); *F24S 2030/133* (2018.05)

(56) References Cited

U.S. PATENT DOCUMENTS

| | | | |
|---|---|---|---|
| 4,595,402 A | 6/1986 | Silletto et al. | |
| 4,762,298 A * | 8/1988 | Wood | F16M 11/126 248/179.1 |
| 8,476,521 B2 | 7/2013 | Luo | |
| 2010/0051016 A1 * | 3/2010 | Ammar | F24S 23/80 126/600 |
| 2013/0068280 A1 * | 3/2013 | Luo | H02S 20/00 136/246 |
| 2014/0123645 A1 | 5/2014 | Luo | |
| 2015/0311856 A1 * | 10/2015 | Luo | E04D 13/00 52/173.3 |

FOREIGN PATENT DOCUMENTS

| | | |
|---|---|---|
| EP | 2571063 A2 | 3/2013 |
| JP | 0217238 A | 1/1990 |
| JP | 2007-113605 | 5/2007 |
| JP | 3173271 U | 2/2012 |
| JP | 2013-225650 | 10/2013 |
| JP | 2014-152602 | 8/2014 |
| JP | 3195656 U | 1/2015 |
| JP | 2015-518703 A | 7/2015 |
| JP | 3199012 U | 7/2015 |
| TW | 201418646 A | 5/2014 |
| TW | 201532380 A | 8/2015 |
| TW | M545232 U | 7/2017 |
| WO | WO99/55553 A1 | 11/1999 |

* cited by examiner

SOLAR GENERATOR APPARATUS WITH ELASTICALLY RESTRICTIVE AND CABLE-CONTROLLED TRACKING

CROSS-REFERENCE TO RELATED APPLICATION

This application claims priority of No. 106106936 filed in Taiwan R.O.C. on Mar. 3, 2017 under 35 USC 119, the entire content of which is hereby incorporated by reference.

BACKGROUND OF THE INVENTION

Field of the Invention

The invention relates to a solar generator apparatus with elastically restrictive and cable-controlled tracking, and more particularly to a solar generator apparatus using a middle column and cables to control a sun-tracking function of a solar generator module.

Description of the Related Art

Usually, a solar generator system is mounted on a building or in a fixed manner, and cannot be adjusted according to the azimuth angle of the sun, so that the received availability of the solar energy is limited. Alternatively, a wind-solar hybrid generator system has a cylinder for supporting a wind power generator, and a solar generator module, which is usually very small and is mounted on the cylinder. Because the middle portion of the solar generator module is directly and slantingly fixed to the cylinder, the solar generator module may be damaged by the strong wind if its area is too large. This is because the structural strength of connection between the cylinder and the solar generator module is insufficient to withstand the strong wind. Alternatively, when an external force is suddenly applied to the solar generator module, the solar generator module tends to be damaged due to the too high rigidity of the solar generator module. Thus, the conventional solar generator system still has to be improved.

On the other hand, if cables are used in conjunction with elastic members, such as those disclosed in U.S. Pat. No. 8,476,521 B2, to control the sun-tracking function, the elastic members tend to be damaged by typhoons because the elasticity limit of the elastic member has been exceeded, or the overall solar generator apparatus may be damaged.

BRIEF SUMMARY OF THE INVENTION

It is therefore an object of the invention to provide a solar generator apparatus for controlling a tracking function of a solar generator module using a middle column and cables to achieve the stable and elastic support.

To achieve the above-identified object, the invention provides a solar generator apparatus with elastically restrictive and cable-controlled tracking. The solar generator apparatus is mounted on a fixed structure and includes a solar generator module, a middle column, first and second winding devices, first to fourth cables and first to fourth elastic anchors. The solar generator module has first to fourth corner portions and converts light into electricity. The middle column has a first end mounted on the fixed structure and a second end pivotally connected to a middle portion of a bottom of the solar generator module, and rotatably supports the solar generator module. The first and second winding devices are attached to the middle column. The first cable has a first end connected to the first corner portion and a second end connected to the first winding device. The first cable is wound around the first winding device. The second cable has a first end connected to the second corner portion and a second end connected to the second winding device. The second cable is wound around the second winding device. The third cable has a first end connected to the third corner portion and a second end connected to the first winding device. The third cable is wound around the first winding device. The fourth cable has a first end connected to the fourth corner portion and a second end connected to the second winding device. The fourth cable is wound around the second winding device. An angle of the solar generator module is adjusted by rotating one or both of the first winding device and the second winding device. The first to fourth elastic anchors are elastically mounted on the fixed structure and correspond to the first to fourth corner portions, respectively. The first to fourth cables pass through the first to fourth elastic anchors, respectively, to form two W-shaped structures, one or each of the first to fourth elastic anchors includes an elastic member and a restricting member connected in parallel, and the restricting member restricts a maximum deformation amount of the elastic member.

Accordingly, the solar generator apparatus with elastically restrictive and cable-controlled tracking according to the invention can have the stable, elastic and restrictive support and sun-tracking effects, is thus suitable for the large generator application, can be rotated and moved with multiple degrees of freedom to track the sun, can resist the strong wind and can be adapted to various applications to effectively enhance the received availability of the solar energy and reduce the damage rate of the solar generator apparatus.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

The present invention will be apparent from the following detailed description, which proceeds with reference to the accompanying drawings, wherein the same references relate to the same elements.

The following term "connection" includes, without limitation to, direct connection or indirect connection.

Figure 1:
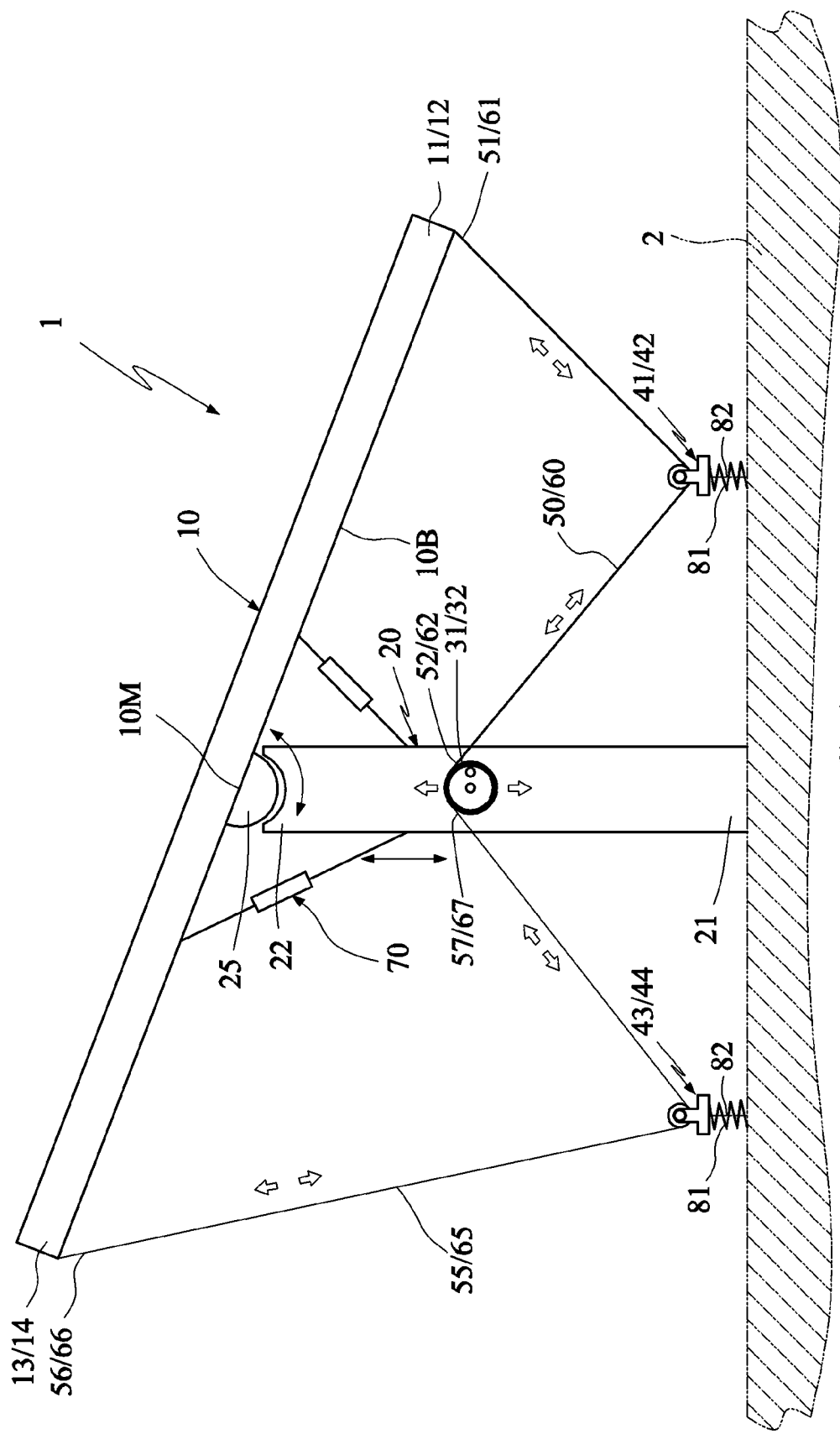
FIGS. 1 and 2 are schematic illustrations showing two states of a solar generator apparatus according to a preferred embodiment of the invention.
Figure 2:
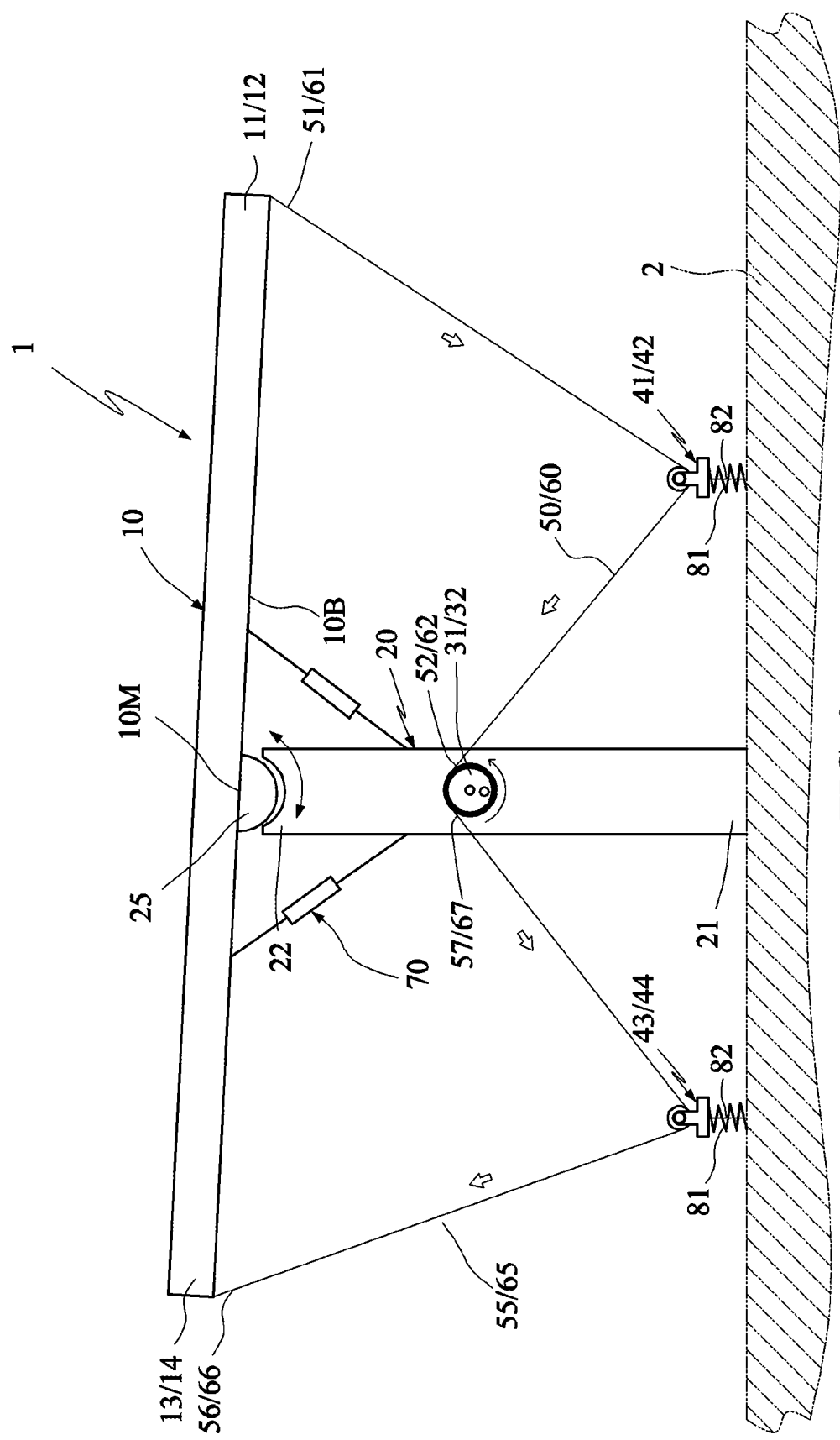
Figure 3:
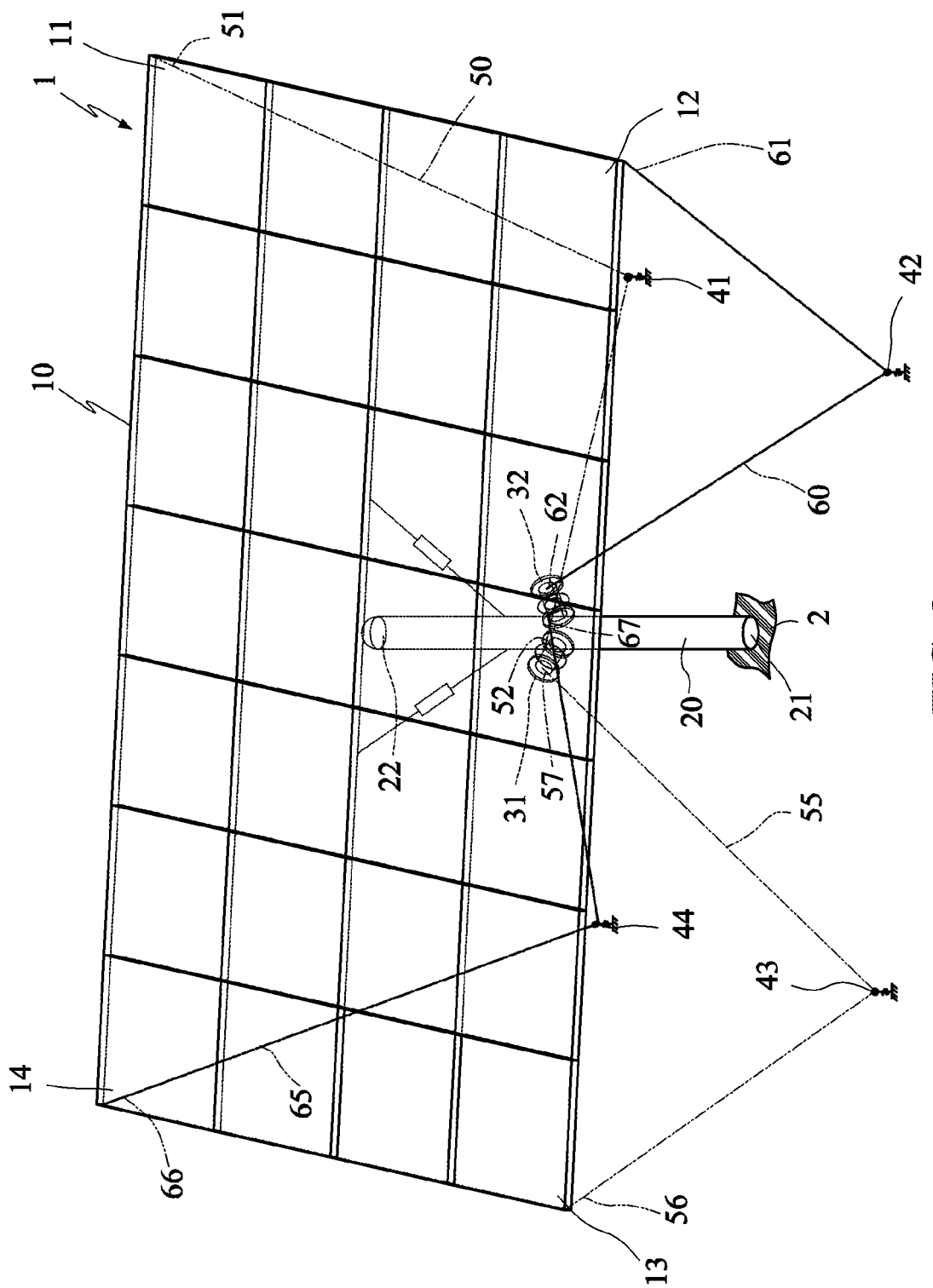
FIG. 3 is a pictorial view showing the solar generator apparatus according to the preferred embodiment of the invention.

FIGS. 1 and 2 are schematic illustrations showing two states of a solar generator apparatus 1 according to a preferred embodiment of the invention. FIG. 3 is a pictorial view showing the solar generator apparatus 1 according to the preferred embodiment of the invention. Referring to FIGS. 1 to 3, the solar generator apparatus 1 with elastically restrictive and cable-controlled tracking according to the preferred embodiment of the invention is mounted on a fixed structure 2, and includes a solar generator module 10, a middle column 20, first and second winding devices 31 and 32, a first cable 50, a second cable 60, a third cable 55, a fourth cable 65, and first to fourth elastic anchors 41 to 44. It is to be noted that the first and second winding devices 31 and 32 in FIGS. 1 and 2 are depicted in the simplified manner so as not to cloud the features of the invention. In addition, the first to fourth cables are not directly connected together, and the cable may also be referred to as a connection wire, especially a steel cable. The fixed structure 2 includes, for example but without limitation, the ground, building, metal base or the like.

The solar generator module 10 converts light into electricity, and has first to fourth corner portions 11 to 14. The first to fourth corner portions 11 to 14 need not to be four corners of the solar generator module 10, and may be the portions near the four corners thereof.

The middle column 20 for rotatably supporting the solar generator module 10 has a first end 21 mounted on the fixed structure 2, and a second end 22 pivotally connected to a middle portion 10M of a bottom 10B of the solar generator module 10. The middle portion 10M is preferably located at or near a center of gravity of the solar generator module 10. However, the invention is not particularly restricted thereto. The second end 22 of the middle column 20 is pivotally connected to the middle portion 10M of the bottom 10B of the solar generator module 10 through a universal joint 25. The universal joint 25 includes a ball and a spherical concave portion working in conjunction with the ball, and is well known in the art, so detailed descriptions thereof will be omitted. As a result, the solar generator module 10 may be rotated freely about the universal joint 25, and the user can easily adjust the arrangement or position angle of the solar generator module 10 to track the sun. The middle column 20 is retractable in length, but may also have the fixed length. Rotating the first/second winding device 31/32 can change the lengths of the portions of the first/second cable 50/60 on two sides of the first/second winding device 31/32, and thus change the angle of the solar generator module 10.

The first and second winding devices 31, 32 are attached to the middle column 20. It is to be noted that the first and second winding devices 31, 32 are movably disposed on or in the middle column 20 so that the levels of the first and second winding devices 31, 32 can be adjusted by the mechanism, including a pinion and a rack working in conjunction with each other, a nut and a screw rod working in conjunction with each other, or the like. Because the mechanism is well known in the art, detailed descriptions thereof will be omitted. The first and second winding devices 31, 32 may be manual or electrical winding devices. The first and second winding devices 31, 32 may be accommodated within the middle column 20 or disposed on the external surface of the middle column 20 without any restrictive purpose.

The first cable 50 has a first end 51 connected to the first corner portion 11 and a second end 52 connected to the first winding device 31. The first cable 50 is wound around the first winding device 31.

The second cable 60 has a first end 61 connected to the second corner portion 12 and a second end 62 connected to the second winding device 32. The second cable 60 is wound around the second winding device 32.

The third cable 55 has a first end 56 connected to the third corner portion 13 and a second end 57 connected to first winding device 31, and the third cable 55 is wound around the first winding device 31.

The fourth cable 65 has a first end 66 connected to the fourth corner portion 14 and a second end 67 connected to the second winding device 32, and the fourth cable 65 is wound around the second winding device 32. The position angle of the solar generator module 10 may be adjusted by rotating one or both of the first winding device 31 and the second winding device 32 to achieve the elastic sun-tracking effect and increase the power generation efficiency.

Each of the first to fourth elastic anchors 41 to 44 includes an elastic member 81 and a restricting member 82 connected in parallel, and thus may be referred to as an elastically restrictive anchor. The restricting member 82 restricts a maximum deformation amount of the elastic member 81, and may also be referred to as a length restricting member. It is worth noting that although each of the first to fourth elastic anchors 41 to 44 in the preferred embodiment includes the elastic member 81 and the restricting member 82, the function of the invention can be achieved as long as one or each of two or three of the first to fourth elastic anchors 41 to 44 includes the elastic member 81 and the restricting member 82, so the invention is not restricted thereto. The first to fourth elastic anchors 41 to 44 are elastically mounted on the fixed structure 2, and correspond to the first to fourth corner portions 11 to 14. The first cable 50, the second cable 60, the third cable 55 and the fourth cable 65 pass through the first elastic anchor 41, the second elastic anchor 42, the third elastic anchor 43 and the fourth elastic anchor 44, respectively, to form two W-shaped structures. Rotating the first/second winding device 31/32 can change the lengths of the portions of the cables on two sides of the first/second winding device 31/32, and thus change the angle of the solar generator module 10. The two W structures can make the overall structure of the solar generator apparatus 1 become stabler, and the solar generator apparatus 1 cannot be easily damaged by the external force, caused by the strong wind or earthquakes.

In addition, the solar generator apparatus 1 may further include multiple buffer assemblies 70, which can retractably connect the middle column 20 to the solar generator module 10 to assist in supporting and buffering the solar generator module 10, to which the external force is applied. The buffer assembly 70 includes, for example, an oil cylinder, a pneumatic cylinder or any other assembly which can provide the effect of buffering the large external force, applied to or exerted on the solar generator module 10, so that the damage can be reduced.

Figure 4:
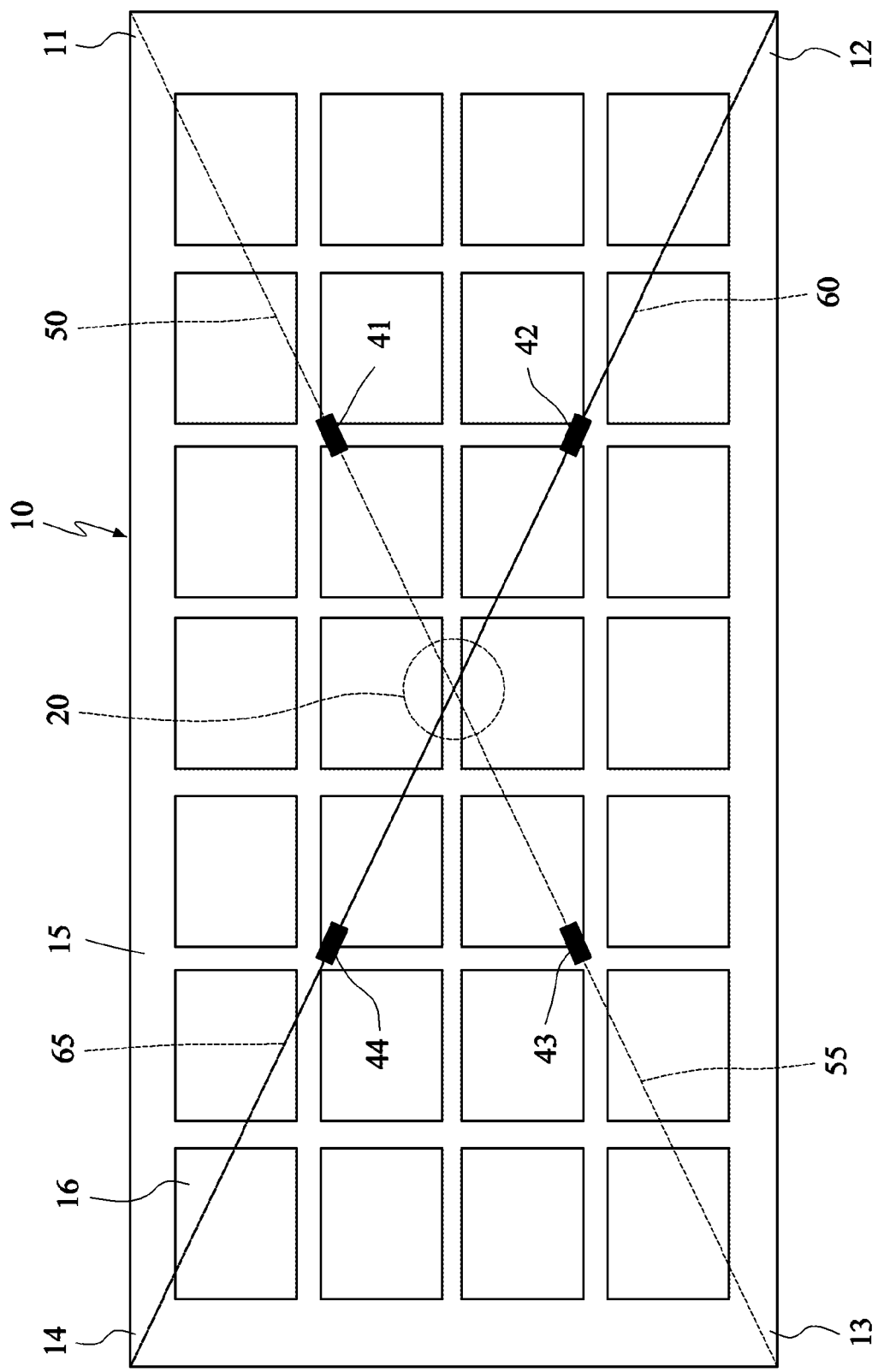
FIGS. 4 and 5 are top views showing two examples of the solar generator module according to the preferred embodiment of the invention.
Figure 5:
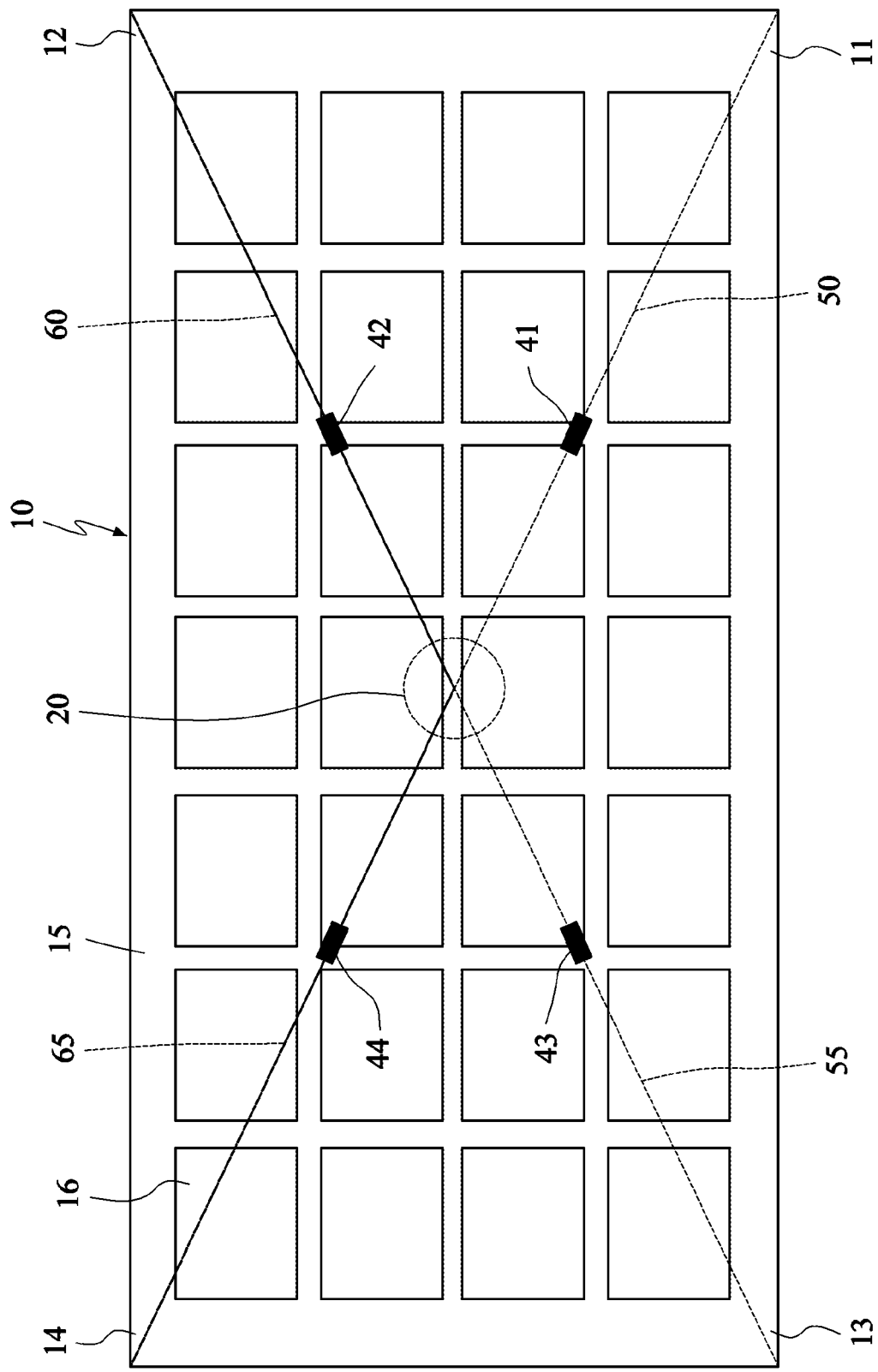

FIGS. 4 and 5 are top views showing two examples of the solar generator module 10 according to the preferred embodiment of the invention. Referring to FIGS. 4 and 5, the solar generator module 10 includes a frame 15 and multiple solar panels 16. The frame 15 is connected to the first cable 50, the second cable 60, the third cable 55, the fourth cable 65 and the middle column 20. The solar panels 16 are mounted on the frame 15 and arranged in an array, and are electrically connected together in parallel and/or in series. The difference between FIGS. 4 and 5 resides in that the positions of the first corner portion 11 and the second corner portion 12 are defined differently so that the four cables of FIG. 5 have the paths different from those of FIG. 4.

Figure 6:
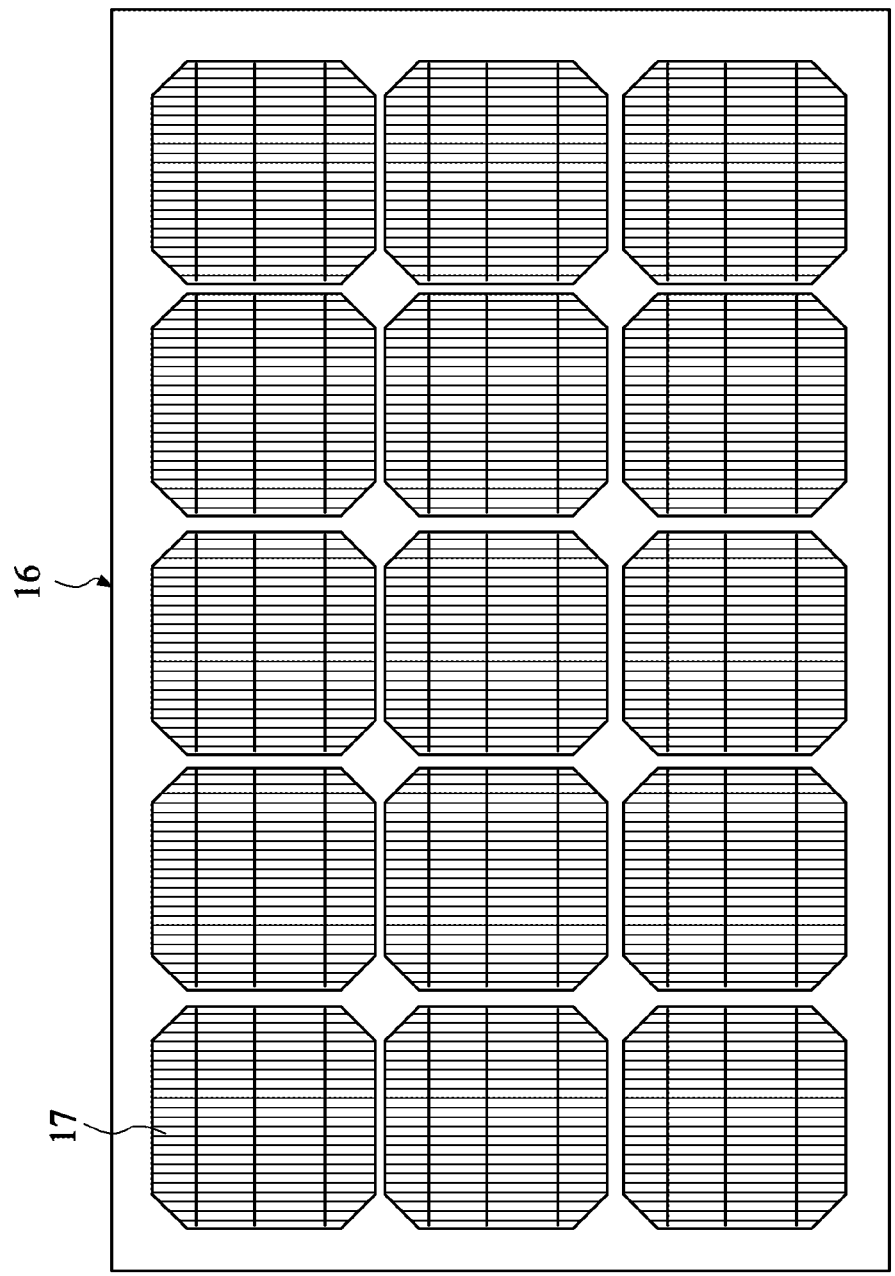
FIG. 6 is a top view showing a solar panel of the solar generator apparatus according to the preferred embodiment of the invention.

FIG. 6 is a top view showing the solar panel 16 of the solar generator apparatus 1 according to the preferred embodiment of the invention. As shown in FIG. 6, each solar panel 16 includes multiple solar cells 17 connected in parallel and/or in series. The solar cell 17 may be a single-crystal solar cell, a polycrystalline solar cell, a film solar cell or any other type of solar cell.

Figure 7:
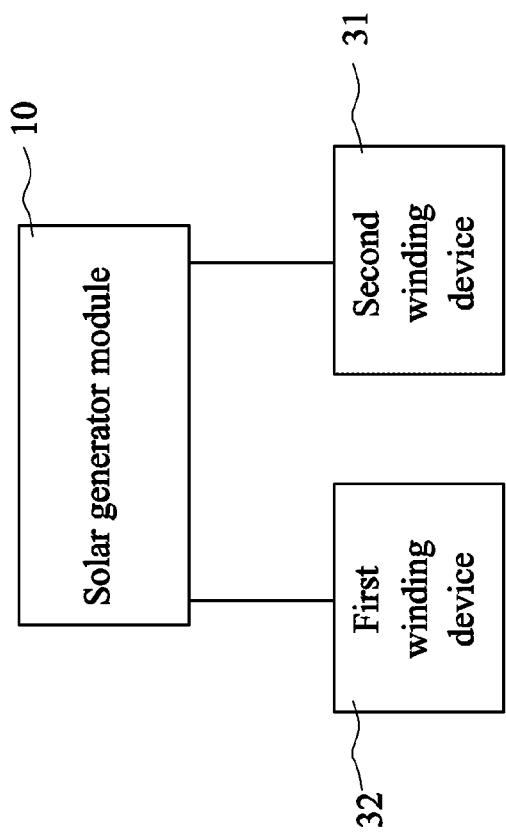
FIG. 7 is a block diagram showing connections between the solar generator module and the first and second winding devices according to the preferred embodiment of the invention.

FIG. 7 is a block diagram showing connections between the solar generator module 10 and the first and second winding devices 31, 32 according to each embodiment of the invention. As shown in FIG. 7, the first and second winding devices 31, 32 are electrical winding devices powered by the solar generator module 10, a battery or the supply mains.

Figure 8:
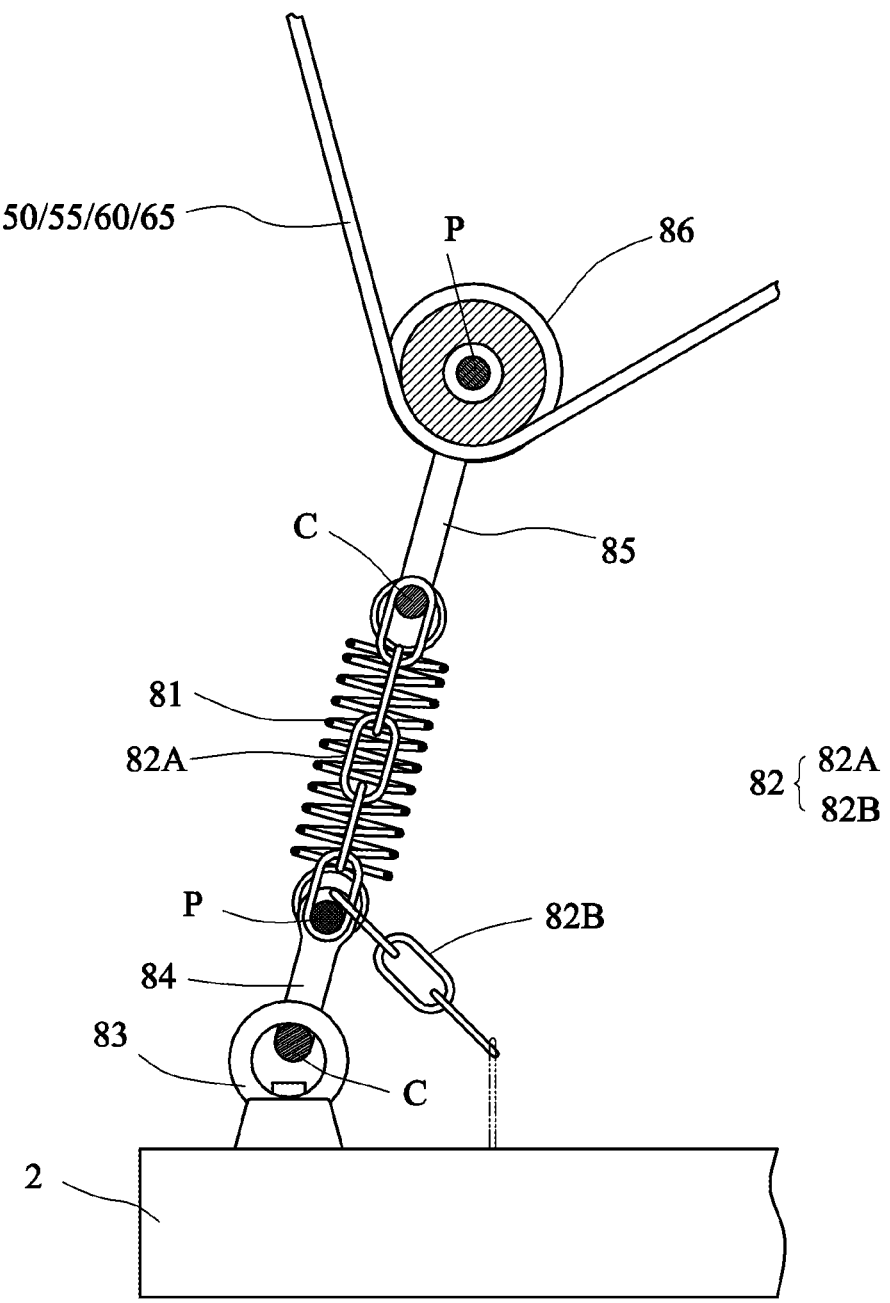
FIG. 8 is a schematic view showing another embodiment of an elastic anchor of FIG. 3.

FIG. 8 is a schematic view showing another embodiment of an elastic anchor of FIG. 3. Referring to FIG. 8, one or each of the first to fourth elastic anchors 41 to 44 further includes a fixing assembly 83, a first linking assembly 84, a second linking assembly 85 and a guide member 86. The fixing assembly 83 is fixed to the fixed structure 2. The first linking assembly 84 is rotatably linked or connected to the fixing assembly 83. The elastic member 81 and the restricting member 82 link the first linking assembly 84 to the second linking assembly 85. The guide member 86 is rotatably linked or connected to the second linking assembly 85. One of the first to fourth cables 50, 60, 55 and 65 corresponding to the guide member 86 is connected to the guide member 86 and is turned from one direction to another direction by the guide member 86.

The first linking assembly 84 and the second linking assembly 85 may be shackles each having a U-shaped structure. The first linking assembly 84 is connected to the elastic member 81 and the restricting member 82 through a pin P. The second linking assembly 85 is connected to the guide member 86 through another pin P. Cross sections C of the first linking assembly 84 and the second linking assembly 85 represent the bottoms of the U-shaped structures hooking the elastic member 81 and the fixing assembly 83, respectively.

In this embodiment, the guide member 86 is a pulley, and each of the first to fourth cables is a steel cable. The elastic member 81 is a tension spring, and the restricting member 82 passes through a hollow space of the tension spring. The restricting member 82 is a metal chain having links hooking together. These links can be accommodated within the inner space of the tension spring in a loosen state.

In addition, the metal chain has a first section 82A and a second section 82B, the first section 82A restricts the maximum deformation amount of the elastic member 81, and the second section 82B does not restrict the maximum deformation amount of the elastic member 81 and is provided for the length adjustment. In order to prevent the second section 82B from moving, the second section 82B of the metal chain may also be fixed to the fixed structure 2 to provide the assistant fixing function. That is, the second section 82B, the fixing assembly 83 and the first linking assembly 84 may cooperate with one another to provide the more reliable way to resist the strong wind that may cause the damage.

Figure 9:
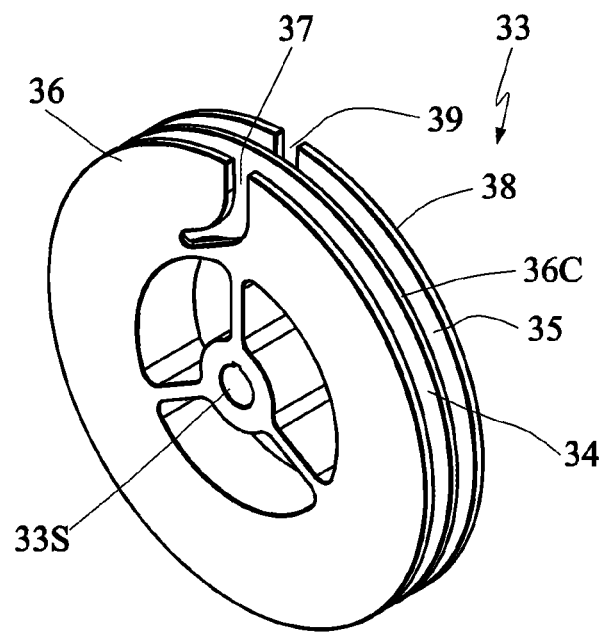
FIGS. 9 to 11 are a pictorial view, a schematic front view and a schematically partial cross-sectional view, respectively, showing another embodiment of a first winding device of FIG. 3.
Figure 10:
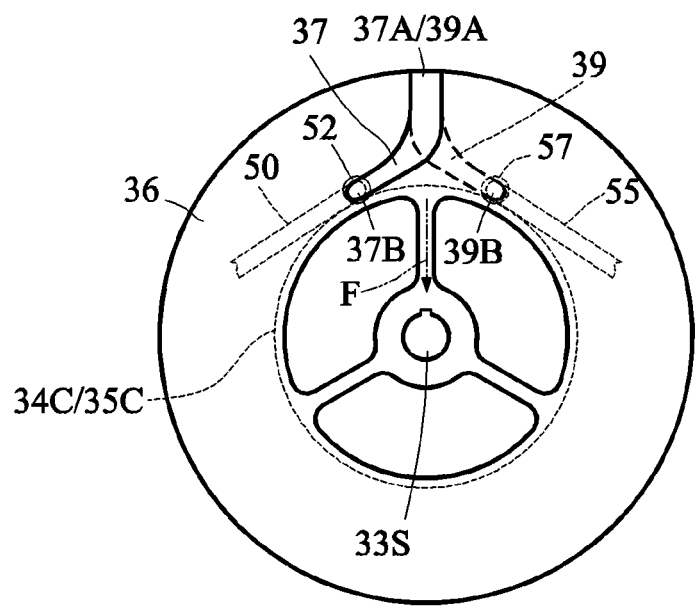
Figure 11:
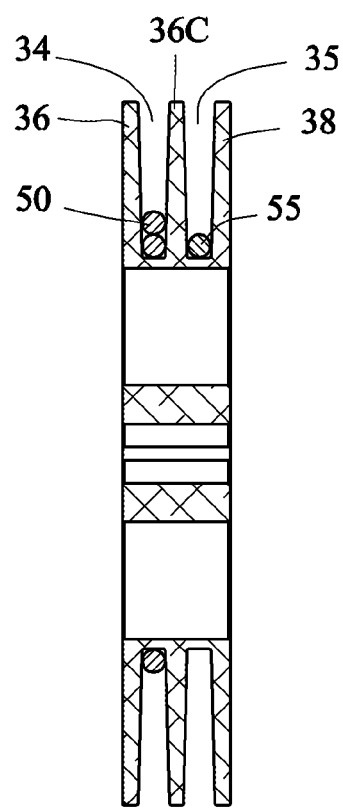

FIGS. 9 to 11 are a pictorial view, a schematic front view and a schematically partial cross-sectional view, respectively, showing another embodiment of a first winding device of FIG. 3. Referring to FIGS. 9 to 11, the first winding device includes a first drive wheel 33. In still another embodiment, the first winding device may further include a motor for driving the first drive wheel 33. The first drive wheel 33 includes a first winding groove 34 and a third winding groove 35 for accommodating the first cable 50 and the third cable 55, respectively. The first winding groove 34 and the third winding groove 35 are separated from each other by a separation flange 36C. In this embodiment, the first cable 50 and the third cable 55 are always in tensile states without loosen states, so the first cable 50 and the third cable 55 provide a first resultant force F, passing through a shaft hole 33S of the first drive wheel 33, to the first drive wheel 33. In order to achieve this effect, the first cable 50 and the third cable 55 only can be reversely twined around the first winding groove 34 and the third winding groove 35, respectively, in a radially stacked manner to maintain the tensile extents of both the first cable 50 and the third cable 55. Because circumference surfaces 34C and 35C of the bottoms of the first winding groove 34 and the third winding groove 35 have the same dimension, the length of the first cable 50 twined around the first winding groove 34 is equal to the length of the third cable 55 twined around the third winding groove 35. In addition, the radially stacked manner makes the cables be twined and released synchronously to effectively maintain the tensile states of the cables and prevent the cables from getting loose and being moved by the strong wind with the huge displacement to impact and damage other members. Thus, although the winding groove in FIG. 11 is a V-shaped groove, its maximum dimension is preferably smaller than a double of the diameter of the cable, is more preferably smaller than 1.8 times of the diameter of the cable, and is most preferably smaller than 1.2, 1.3, 1.4, 1.5 or 1.6 times of the diameter of the cable.

In order to facilitate the installation of the cables on site, the second end 52 of the first cable 50 is fit with and fixed to a first fitting groove 37 of a first lateral flange or rim 36 of the first winding groove 34, and the second end 57 of the third cable 55 is fit with and fixed to a third fitting groove 39 of a third lateral flange or rim 38 of the third winding groove 35, wherein the first fitting groove 37 and the third fitting groove 39 are reversely C-shaped, and the dimensions of the opening sections 37A and 39A of the first fitting groove 37 and the third fitting groove 39 are greater than the dimensions of the closing sections 37B and 39B of the first fitting groove 37 and the third fitting groove 39. Because the tail end of the cable is typically closed to form a larger head, the larger head can fix the cable to the fitting groove.

Figure 12:
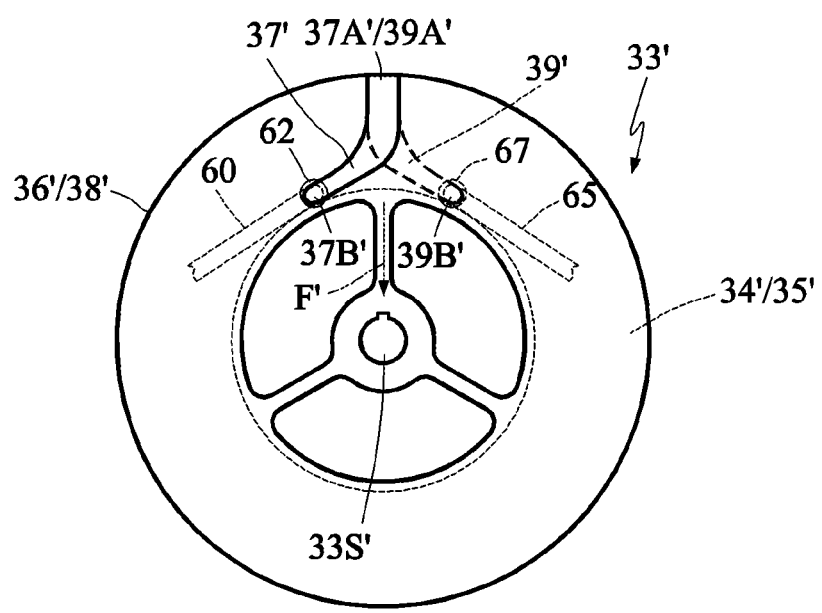
FIG. 12 is a schematic front view showing another embodiment of a second winding device of FIG. 3.

FIG. 12 is a schematic front view showing another embodiment of a second winding device of FIG. 3. Referring to FIG. 12, the second winding device 32 includes a second drive wheel 33', which includes a second winding groove 34' and a fourth winding groove 35' for receiving or accommodating the second cable 60 and the fourth cable 65, respectively. The second cable 60 and the fourth cable 65 provide a second resultant force F', passing through a shaft hole 33S' of the second drive wheel 33', to the second drive wheel 33'. The second cable 60 and the fourth cable 65 only can be reversely twined around the second winding groove 34' and the fourth winding groove 35' in a radially stacked manner to maintain the tensile extents of both of the second cable 60 and the fourth cable 65. The second drive wheel and the first drive wheel may have similar structures.

Thus, the second end 62 of the second cable 60 is fit with and fixed to a second fitting groove 37' of a second lateral flange 36' of the second winding groove 34', and the second end 67 of the fourth cable 65 is fit with and fixed to a fourth fitting groove 39' of a fourth lateral flange 38' of the fourth winding groove 35', wherein the second fitting groove 37' and the fourth fitting groove 39' are reversely C-shaped, and the dimensions of the opening sections 37A' and 39A' of the second fitting groove 37' and the fourth fitting groove 39' are greater than the dimensions of the closing sections 37B' and 39B' of the second fitting groove 37' and the fourth fitting groove 39'.

Accordingly, the solar generator apparatus with elastically restrictive and cable-controlled tracking according to the invention can have the stable, elastic and restrictive support and sun-tracking effects, is thus suitable for the large generator application, can be rotated and moved with multiple degrees of freedom to track the sun, can resist the strong wind and can be adapted to various applications to effectively enhance the received availability of the solar energy and reduce the damage rate of the solar generator apparatus.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A solar generator apparatus with elastically restrictive and cable-controlled tracking, the solar generator apparatus being mounted on a fixed structure, the solar generator apparatus comprising:
    a solar generator module, which has first to fourth corner portions and converts light into electricity;
    a middle column, which has a first end mounted on the fixed structure and a second end pivotally connected to a middle portion of a bottom of the solar generator module, and rotatably supports the solar generator module;
    first and second winding devices attached to the middle column;
    a first cable having a first end connected to the first corner portion and a second end connected to the first winding device, wherein the first cable is wound around the first winding device;
    a second cable having a first end connected to the second corner portion and a second end connected to the second winding device, wherein the second cable is wound around the second winding device;
    a third cable having a first end connected to the third corner portion and a second end connected to the first winding device, wherein the third cable is wound around the first winding device;
    a fourth cable having a first end connected to the fourth corner portion and a second end connected to the second winding device, wherein the fourth cable is wound around the second winding device, wherein an angle of the solar generator module is adjusted by rotating one or both of the first winding device and the second winding device; and
    first to fourth elastic anchors elastically mounted on the fixed structure and corresponding to the first to fourth corner portions, respectively, wherein the first to fourth cables pass through the first to fourth elastic anchors, respectively, to form two W-shaped structures, one or each of the first to fourth elastic anchors comprises an elastic member and a restricting member connected in parallel, and the restricting member restricts a maximum deformation amount of the elastic member,
    wherein the elastic member is a tension spring, the restricting member passes through a hollow space of the tension spring, and the restricting member is a metal chain; and
    wherein the metal chain has a first section and a second section, the first section restricts the maximum deformation amount of the elastic member, and the second section does not restrict the maximum deformation amount of the elastic member, and is provided for length adjustment.

2. The solar generator apparatus according to claim 1, wherein one or each of the first to fourth elastic anchors further comprises:
    a fixing assembly fixed to the fixed structure;
    a first linking assembly rotatably linked to the fixing assembly;
    a second linking assembly, wherein the elastic member and the restricting member connect the first linking assembly to the second linking assembly; and
    a guide member rotatably linked to the second linking assembly, wherein one of the first to fourth cables corresponding to the guide member is connected to the guide member and is turned by the guide member.

3. The solar generator apparatus according to claim 2, wherein the guide member is a pulley, and each of the first to fourth cables is a steel cable.

4. The solar generator apparatus according to claim 1, wherein the second section of the metal chain is fixed to the fixed structure to provide an assistant fixing function.

5. A solar generator apparatus with elastically restrictive and cable-controlled tracking, the solar generator apparatus being mounted on a fixed structure, the solar generator apparatus comprising:
    a solar generator module, which has first to fourth corner portions and converts light into electricity;
    a middle column, which has a first end mounted on the fixed structure and a second end pivotally connected to a middle portion of a bottom of the solar generator module, and rotatably supports the solar generator module;
    first and second winding devices attached to the middle column;
    a first cable having a first end connected to the first corner portion and a second end connected to the first winding device, wherein the first cable is wound around the first winding device;
    a second cable having a first end connected to the second corner portion and a second end connected to the second winding device, wherein the second cable is wound around the second winding device;
    a third cable having a first end connected to the third corner portion and a second end connected to the first winding device, wherein the third cable is wound around the first winding device;
    a fourth cable having a first end connected to the fourth corner portion and a second end connected to the second winding device, wherein the fourth cable is wound around the second winding device, wherein an angle of the solar generator module is adjusted by rotating one or both of the first winding device and the second winding device; and first to fourth elastic anchors elastically mounted on the fixed structure and corresponding to the first to fourth corner portions, respectively, wherein the first to fourth cables pass through the first to fourth elastic anchors, respectively, to form two W-shaped structures, one or each of the first to fourth elastic anchors comprises an elastic member and a restricting member connected in parallel, and the restricting member restricts a maximum deformation amount of the elastic member, wherein the first winding device comprises a first drive wheel, and the first drive wheel comprises: a first winding groove and a third winding groove accommodating the first cable and the third cable, respectively, wherein the first cable and the third cable provide a first resultant force, passing through a shaft hole of the first drive wheel, to the first drive wheel;

wherein the first cable and the third cable only can be reversely twined around the first winding groove and the third winding groove in a radially stacked manner to maintain tensile extents of both the first cable and the third cable; and wherein the second end of the first cable is fit with and fixed to a first fitting groove of a first lateral flange of the first winding groove, and the second end of the third cable is fit with and fixed to a third fitting groove of a third lateral flange of the third winding groove, wherein the first fitting groove and the third fitting groove are reversely C-shaped, and dimensions of opening sections of the first fitting groove and the third fitting groove are greater than dimensions of closing sections of the first fitting groove and the third fitting groove.

6. The solar generator apparatus according to claim 5, wherein the second winding device comprises a second drive wheel, and the second drive wheel comprises:

a second winding groove and a fourth winding groove accommodating the second cable and the fourth cable, respectively, wherein the second cable and the fourth cable provide a second resultant force, passing through a shaft hole of the second drive wheel, to the second drive wheel, and the second cable and the fourth cable only can be reversely twined around the second winding groove and the fourth winding groove, respectively, in a radially stacked manner to maintain tensile extents of both the second cable and the fourth cable.

* * * * *